MULTIVIBRATOR CIRCUIT

Filed Feb. 1, 1954

INVENTOR
J. H. McCONNELL
BY G. T. Morris
ATTORNEY 2,802,941
Patented Aug. 13, 1957

2,802,941

MULTIVIBRATOR CIRCUIT

John H. McConnell, Murray Hill, N. J., assignor to Bell Telephone Laboratories, Incorporated, New York, N. Y., a corporation of New York Application February 1, 1954, Serial No. 407,548

2 Claims. (Cl. 250—27)

This invention relates to a multivibrator circuit and especially to expedients applied to the conventional prototype, comprising a bistable organization of two vacuum tubes with cross coupling, to enable such prototype circuit to have the outstanding attributes to be defined presently among the objects and features of the invention, but which principally adapt said prototype circuit to function efficiently in switching circuits, binary counter circuits and the like. Perhaps the principal attribute of the organization having these applications in mind is the characteristic of the resultant wave form as having relatively sharp leading and trailing edges.

The objects of the invention may be inferred from the above brief description and may therefore be stated as the provision of means to stabilize the above prototype multivibrator, so as to insure a wave form which is faithfully repeated by consecutive cycles, and which wave form is more nearly a prefectly symmetrical square, therefore marked by optimum, and practically equal, rise and fall times. As above intimated, these optimum rise and fall times imply very sharp leading and trailing edges.

Other characteristics of the invention the achievement of which constitutes further objects, but which result also from the provisions whereby the above objects are achieved, comprise: unusual freedom from noise response; virtual elimination of the overshoot commonly observed on the trailing edge of the resultant output pulse; higher operating speed; controllability of the rise and fall times by the electrical design of the coupling networks; and greater available output since, because of the inherently greater stability and discrimination from random noise, a lesser degree of grid biasing may be used.

Other characteristics and attributes of the invention should be perceivable from the following detailed description of the organization of the invention with reference to the attached drawing wherein.

Figure 1:
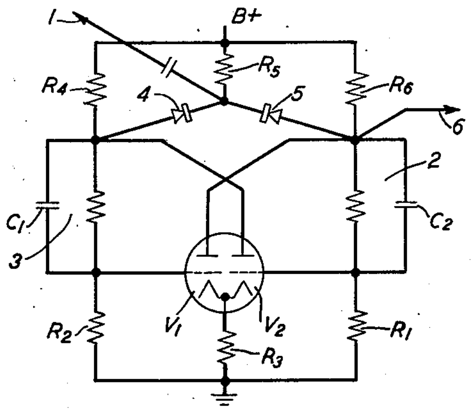
Fig. 1 illustrates the prototype bistable multivibrator referred to so many times above.
Figure 2:
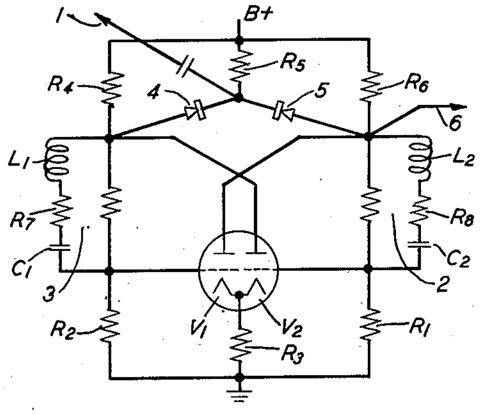
Fig. 2 illustrates a practical embodiment of the invention successfully operated by applicant, as a trigger-operated bistable multivibrator.
Figure 3:
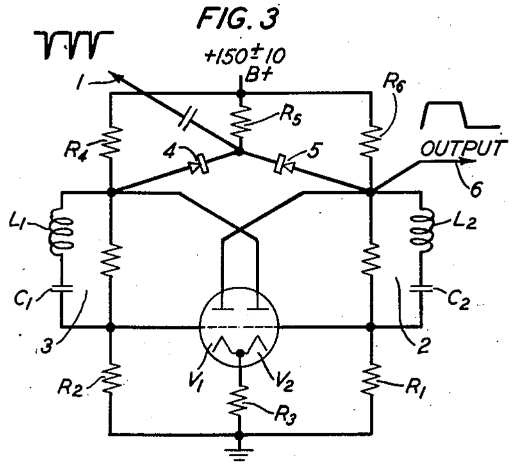
Fig. 3 illustrates the circuit of Fig. 2 as adapted to use as the initial stage of a multistage binary counter, this being one of the principal uses perceived for the invention.

The invention will be treated first in such a way as to merely point out the continuity of the circuits concerned and this treatment will be followed by an operational analysis to bring out the practical attributes of the organization of the invention, especially where it, as illustrated by Figs 2 and 3, differs from the prototype organization of Fig. 1. This latter treatment will most conveniently follow the scheme of a historical resume of the evolution of the invention from the simplest type of prototype circuit as determined by the particular need and the degree of satisfaction of such need at the various intermediate stations of the evolution.

Fig. 1 will be recognized as illustrating a conventional form of bistable multivibrator having cross coupling between the respective triode tubes $V_1$ and $V_2$. The circuit is basically the same as that disclosed in page 164, by Figs. 5.4 and accompanying text, of volume 19 of the Radiation Laboratories Series, 1949. The operation of the circuit depends upon the fact that two stable conditions may exist, that is, with either tube $V_1$ conducting and tube $V_2$ cut off or vice versa, and that a rapid change from one said stable condition to the other can be initiated by suitably injecting a suitable pulse into the circuit as at point 1. If initially tube $V_1$ is conducting, its plate (anode) is at a potential lower than normal because of the drop in its external circuit principally constituted by resistance $R_6$. This potential will therefore be low enough to keep the grid of tube $V_2$ in the cut-off range of operation. However, said plate of tube $V_2$ will correspondingly be at such a high potential, since little current flows through the corresponding elements $R_4$, coupling circuit 3 and $R_2$ of its external circuit, that said tube $V_1$ is maintained in its conducting range by the direct coupling from the output circuit of said tube $V_2$ to the grid of tube $V_1$.

However, a negative trigger pulse applied at point 1 reverses the condition by cutting off tube $V_1$ whereby tube $V_2$ in turn becomes conducting. This comes about by the impression of the negative trigger pulse on the plate of tube $V_2$ which reflects a negative potential on the grid of tube $V_1$ to cause it to cut off. This is fully explained in page 164 text of the above volume. The diodes 4 and 5 are strategically located and poled so as to permit the impression of the negative pulse to the respective tubes as is also explained in the above volume. These diodes may well be constituted, although not necessarily so, by conventional varistors. The plate supplies for the two tubes may be traced from the indicated positive terminal of the imputed battery or the equivalent through resistances $R_4$, and $R_6$. The output voltage wave from this bistable multivibrator may be led off at point 6, that is, between this point and a choice of other points in the circuit such as the ground shown below the cathodes of the tubes and resistance $R_3$ or above the resistance $R_6$.

The function of condensers $C_1$ and $C_2$ is to prevent excessive charging time by effectively shorting the related resistances constituting the remaining elements of above referred to circuits 2 and 3. The charging time, otherwise, would be greater because of the inherent input tube capacitances in relation to the resistances of said circuits 2 and 3. Since the effective input capacitances of the tubes are related to the product of the actual input interelectrode capacitances and the tube gain, the circuit capacitance from the grid of each tube to ground for the usual miniature triode, which would be intended to use in this circuit, would be in the order of magnitude of 50 micro-microfarad. Said condensers $C_1$ and $C_2$ effectively shunt the leading and trailing edges of each impressed signal pulse directly into the grid. Were these "speeding up" condensers not used, the pulse would change the grid voltage only slowly by virtue of the charging of the input capacitance of the tube in question, through the above resistance of the corresponding one of circuits 2 or 3, and through bias setting resistances $R_1$ (or $R_2$) which would seriously limit the speed of operation of the multivibrator or of the binary counter stage in which it might be included. By the "speeding-up" operations of these condensers the tube $V_1$, for example, having in mind the above-described operation, is cut off so much the sooner, its plate potential rises more rapidly and thereby raises the potential of the grid of the other tube at a corresponding rate and this rise in turn augments the said grid potential rise by lowering the potential of the plate of said plate $V_2$ still further. The sequential operation of the two tubes is thus made to occur more rapidly.

Thus we have explained that the presence of the speeding-up condensers tends to cause the grid voltage of a conducting tube to approach cut-off more rapidly, in response to an applied negative-going trigger signal, or in response to a downward change of anode voltage of the opposite tube, than would otherwise be the case. This is desirable.

The presence of the speeding-up condensers also produces an undesirable effect, however. When the input signal cuts off the tube which has previously been conducting the potential of its anode rises. This rise is communicated, via the opposite speeding-up condenser, to the grid of the tube which was previously held in the cut-off condition, and tends to make its voltage more positive. Before more than a fraction of the rise in anode potential has taken place, however, the grid has been carried from its previous condition of cut-off voltage all the way up to cathode potential and now, as it is urged further positive, begins to draw grid current as the anode element of a thermionic diode; this changes the impedance seen between grid and cathode from that of a small capacitor paralled by a very high resistance to that of a similar capacitor paralleled by a low resistance of the order of a few thousand ohms—the "forward" resistance of the conducting diode. Thus the anode, whose rise in potential we are considering, now finds itself connected, through the speeding-up condenser, to a low impedance path to ground comprising the forward resistance of the grid-cathode path, acting as a diode, and the cathode self biasing resistance, $R_3$. The anode can complete its rise in potential only by charging the speeding-up condenser through the resistive path comprising the plate supply resistor ($R_4$ or $R_6$) and the low impedance path just mentioned. The remainder of the rise, therefore, follows an exponential curve whose time constant may be quite appreciable if the speeding-up condensers are of generous size (which they should be to achieve the previously discussed desirable effects) and which is shown, in typical form, in the upper part of Fig. 4. The fact that the previously cut-off grid of one of the tubes draws grid current during the latter portion of the transition process, to provide charging current for the associated speeding-up condenser, also accounts for another observed effect: the overshoot on the downward voltage swing of the anode associated with the positive-going grid (the other anode is the one which is rising in voltage and providing the drive for the grid in question). During the time that the speeding-up condenser is being charged, the associated grid is considerably positive with respect to its cathode, and this condition produces a greater than normal anode current thus causing the anode to fall to a lower than normal potential. When the charging process is completed, the grid, which was substantially positive during the charging interval, has subsided to a potential which is only slightly positive with respect to its cathode and the corresponding anode current has also subsided to its normal value, which allows the anode to rise from its overshoot value and level off at its normal value.

It is the essence of the present invention to insert in series with the speeding-up condensers an impedance element or elements which will permit the anode, which is rising in potential, to complete its rise without the hampering effects of speeding-up condensers, and without causing an overshoot in the downward excursion of the opposite anode, while at the same time preserving the desirable effects of the speeding-up condensers, namely that of communicating rapid changes of anode potential to the grid elements of opposite tubes when these changes lie within the so-called grid base of the tube. (The grid base is the region of grid-to-cathode potential between zero and negative cut-off potential.)

This is accomplished by virtue of the fact that the $L_1$, $C_1$, $C^1$ combination (and its counterpart on the opposite side) is resonant at a frequency whose half period is shorter than the required transition time and that an appreciable part of the voltage applied to the combination is realized across $C^1$, the parasitic grid cathode capacitance. When a grid is brought up to zero bias it becomes a low impedance path to cathode but the elements $L_1$ and $C_1$ are still in series and the inductive reactance of $L_1$ prevents $C_1$, the speeding-up condenser, from loading down the driving anode and slowing its rise of potential. Also, by preventing large values of grid current, the overshoot of the voltage swing of the anode is greatly diminished.

Figure 4:
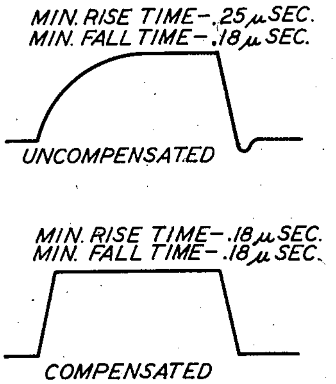
Fig. 4 comprises the comparison of optimum output wave forms for the prototype organization and the organization of the invention, these wave forms being illustrated respectively by the upper and lower curves.

This completes the description of the circuit of prototype multivibrator of Fig. 1 except to indicate with reference to the upper curve of Fig. 4 the configuration of the typical output wave form. It is evident that the wave is not symmetrical, that there is an appreciable overshoot, that the wave form is far from being of a square or rectangular configuration, and that the slopes marking the rise and fall are not equal, as required for the optimum symmetrical wave form, but are far from this desirable condition.

Fig. 2 duplicates the circuit continuity of Fig. 1 except for the inclusion in circuits 3 and 2, respectively, of the compensating inductances $L_1$ and $L_2$, respectively, together with damping resistances $R_7$ and $R_8$. The electrical values of $L_1$ and $C_1$, and likewise of inductance $L_2$ and capacitance $C_2$, were arbitrarily chosen to cause them to resonate at a high frequency of approximately 10 megacycles and $R_7$ and $R_8$ were selected to critically damp the resultant network. Since $C_1$ is in series with the inherent input capacitance of the respective tube and is relatively very small it becomes the controlling capacitance and the entire input structure resonates at about 10 megacycles. Thus a filter system is established which tends to select the 10-megacycle component of the input pulse and transmit it to the grid of the respective tube. The resonant condition results in very fast rise and fall times of very nearly the same duration although usually not precisely of the same configuration. In addition, the trailing edge overshoot common to most devices of this type is eliminated or greatly attenuated. The lower curve of Fig. 4 illustrates the output wave of a typical circuit of the Fig. 3 configuration as experimentally determined.

Fig. 3 illustrates the first stage of a binary counter used in the sweep circuits of an experimental relay gauging setup of the assignee corporation. In the practical application of the circuit, 30-volt pulses appear at the input of this stage at a frequency of 500 kilocycles per second, and are successively subdivided by three additional stages not here shown. It is obvious that the multivibrator of the invention is adapted to be used for binary counting since two pulses are required in the cyclical operation resulting in a single repetitive wave form. The actual continuity of circuits for the stage shown in Fig. 3, from which the remaining stages differ only in the values of the series resistance and capacity used from one stage to the next, is exactly the same as that of Fig. 2 except only that, to illustrate the practical case in which damping resistances were not found to be necessary in the individual resonant networks, these resistances are effectively supplied by the plate load resistances anterior thereto. They are not here shown.

In further consideration of the circuit of the invention as typically indicated by Fig. 2, the following practical analysis may be useful.

For example, it was found that the improvement feature of the invention came into play more particularly at relatively high frequencies, that is, where the rise and fall times become a substantial part of the operating cycle. This in general would be true of a counter stage which would be required to follow a train of pulses having a frequency greater than one megacycle per second. Since the pulses generated, in a particular experimental setup in mind, were employed for a precise gating purpose, timing inaccuracies which were characteristic of the prototype organization stimulated and made necessary the improvement constituted by the invention with greatly improved attributes in the directions indicated.

Although the explanation of the invention, as above, in its resonant aspect, well indicates the purpose and result of adding the compensating feature, that is, the resonant feature, the invention is really quite versatile in its beneficial effects as indicated in the statement of invention. In the prior art, in order to overcome the sensitiveness of the grids to noise signals on account of the coupling condensers $C_1$ and $C_2$, it was customary to over-bias the grids by the use of large negative impressed potential. The noise discrimination properties of the grid coupling network of the invention makes possible the use of a smaller degree of bias than that commonly employed. It has been found that the self-biasing feature, which constitutes a distinct part of the invention, in combination with the compensating feature, enables the tubes to be biased so that the cut-off member is held only about a volt beyond the value indicated on the plate characteristic curves. This results in greater plate swings, in turn enabling lower plate currents and the use of more economical plate supply sources. In addition to these advantages the multivibrator of the invention, especially when used in the counter, becomes much more sensitive to sharp pulses and smaller input signals may be employed.

What is claimed is:

1. A bistable multivibrator comprising a pair of electron tubes each having at least a cathode, an anode and a control electrode, a resistance respective to each anode for connecting the anode of each tube to a positive potential point of an anode current source, a resistance common to the cathodes of said tubes for connecting said cathodes to a point of less positive potential, a two-terminal network connected between the anode of each tube and the control electrode of the other tube, one terminal of each such cross-connecting network being connected to the junction of an anode and its respective resistance and the other terminal of such network being connected with a control electrode, each network consisting of a parallel circuit comprising a resistance in one branch and series-connected inductance and capacitance in a second branch, the latter branch being resonant at a frequency high in relation to that of a given actuating or input wave or pulse, and individual resistances respectively connecting the junctions of said networks and control electrodes to said point of less positive potential.

2. A bistable multivibrator as defined in claim 1 in which each such resonant branch of the cross-connecting network includes a damping resistance critically valued relatively to said resonant frequency.

References Cited in the file of this patent

UNITED STATES PATENTS

| | | |
|---|---|---|
| 2,182,555 | Gieger | Dec. 5, 1935 |
| 2,426,996 | Goodall | Sept. 9, 1947 |
| 2,517,550 | Earp | Aug. 8, 1950 |

OTHER REFERENCES

Bell Laboratories Record, vol. No. XXVIII, Issue No. 5, pages 208–211, May 1950. (Copy in Div. 51.)